G. W. TROOP.
BREAST CHAIN TERMINAL.
APPLICATION FILED SEPT. 12, 1916.

1,219,199.

Patented Mar. 13, 1917.

Inventor
G. W. Troop
By Heath Sutherland
Attorney

UNITED STATES PATENT OFFICE.

GEORGE W. TROOP, OF NEW BRITAIN, CONNECTICUT, ASSIGNOR TO THE NORTH & JUDD MANUFACTURING COMPANY, OF NEW BRITAIN, CONNECTICUT, A CORPORATION OF CONNECTICUT.

BREAST-CHAIN TERMINAL.

1,219,199.  Specification of Letters Patent.  Patented Mar. 13, 1917.

Application filed September 12, 1916. Serial No. 119,674.

*To all whom it may concern:*

Be it known that I, GEORGE W. TROOP, a subject of the King of Great Britain, residing at New Britain, in the county of Hartford and State of Connecticut, have invented certain new and useful Improvements in Breast-Chain Terminals, of which the following is a specification.

This invention relates to what I shall for convenience term a breast chain terminal. As noted I have selected the title in question as a matter of convenience, this in view of the fact that the article constitutes an effective terminal for a breast chain; a heel chain might be connected to it with equal advantage. As a matter of fact there are other parts which might be united with the device. While, therefore, as may be inferred, the article is primarily intended for use in the harness art, it is conceivable that it may be used in whole or in part in other connections. The principal object of the invention is the provision of an appurtenance functioning as set forth, having means of a simple and effective nature, positive and certain in action by which a breast heel chain or analogous part cannot be accidentally separated therefrom.

In the drawings accompanying and forming part of the present specification I have shown in detail one convenient form of embodiment of the invention which will be set forth fully in the following description. As will be obvious, I do not restrict myself to this particular showing; I may depart therefrom in several respects within the scope of the invention defined by the claims following said description.

Referring to said drawings.

Like characters refer to like parts throughout the several views.

There is a breast or chain terminal in use which comprises an elongated shank, having a snap at one end and a hook at the other, the latter for the connection therewith of a breast or heel chain. This type of terminal possesses one disadvantage, namely the lack of strength of the hook which in action very frequently breaks. To eliminate this difficulty as far as practicable there is in use a terminal having a shank provided with an eye instead of the old hook. This eye consists of two hooks, one of which is hinged, this hinged hook being opened to permit the connection therewith of one of the two kinds of chains or any other connector for that matter. This eye possesses the disadvantage of being easily accidentally opened, thus permitting in this case the unintentional disconnection from the eye of the chain or equivalent. This eye possesses the requisite strength, but the difficulty to which I have alluded is inherent to it. I provide a construction wherein this particular difficulty is overcome in a highly advantageous manner, and I will describe the preferred construction which I have selected for illustration in my drawings. As I have already observed, I do not limit myself to the use of the article in any particular field, although it is of especial utility when employed as part of harness.

Figure 1:
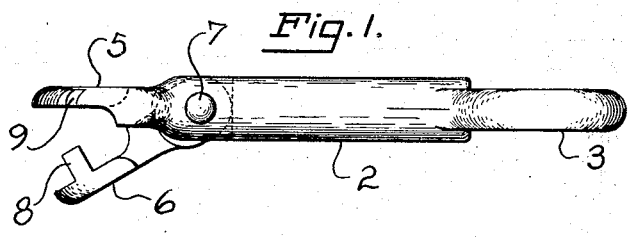
Figure 1 is a bottom plan view of a terminal involving the invention and with the eye open.
Figure 2:
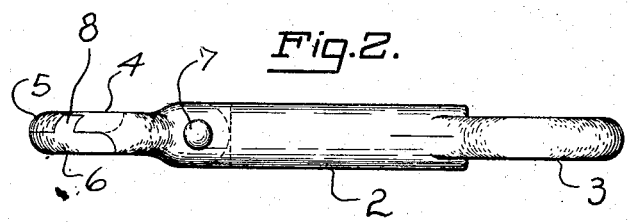
Fig. 2 is a like view of the same with the eye closed and positively maintained in such position.
Figure 3:
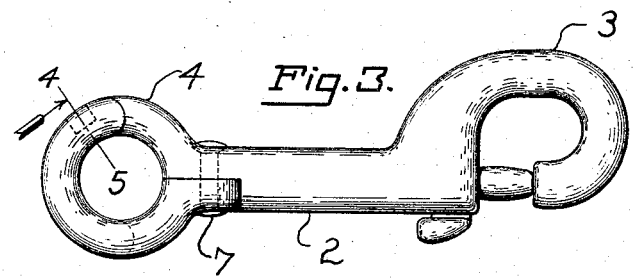
Fig. 3 is a side elevation of said terminal inverted.

The device represented includes in its make-up an elongated shank or body as 2 which is shown as furnished at one end with a snap as 3 and at the other with an eye as 4. This eye is made up of the hooks 5 and 6, the hook 5 being integral with the shank 2, while the butt portion of the hook 6 is pivoted as at 7 to the butt portion of the hook 5. The hooks face oppositely, and when the eye is closed as shown for instance in Fig. 2, the flat inner surface of the swinging or hinged hook 6 fits flatwise against the corresponding surface of the stationary hook 5. The hook 6 as shown in Fig. 1 can be swung away from the companion hook 5 to permit the connection of a chain or the like with the eye, and when the chain is thus connected, the eye will be closed as shown in Fig. 2. The foregoing is a concise description of a breast or heel chain terminal in which my invention can be incorporated. This structure, however, possesses as I have already noted, a defect which I have overcome, and this by the provision of means for locking the sections of the eye positively in closed relation. This result as may be inferred, can be secured in several different ways, although I show and will now describe a highly advantageous means of obtaining it.

One of the complemental hooks of the eye is provided with a latch, the other having means to be engaged by the latch when in operative relation to maintain the eye positively closed. As shown the swinging or hinged hook 6 is equipped with such a latch, that denoted by 8 having been found highly satisfactory. This latch is in the form of a tongue extending laterally inward from the hinged hook 6 near the free end thereof. The latch or tongue is preferably integral with the hinged hook and is also preferably bendable for a reason that will hereinafter appear. The fixed hook 5 has a notch or seat 9 made rectangular to accommodate the latch or tongue 8, the said seat or notch having its rear end closed and its front end opening into the inner flat surface of the hook 5. This seat or notch is in transverse register with the latch or tongue 8 and is of progressively increasing depth commencing at its outer end, its bottom being curved longitudinally. The latch or tongue it will be noted, is of progressively increasing thickness from its free end toward its base. Owing to this construction when the latch is set, as will hereinafter appear, the outer surface of the latch or tongue will be practically flush with the corresponding surface of the stationary hook 5.

Figure 4:
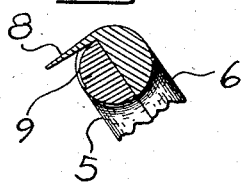
Figs. 4 and 5 are transverse sections on the line 4—5 of Fig. 3 with the eye closed and with the latch in its releasing and locking positions respectively.
Figure 5:
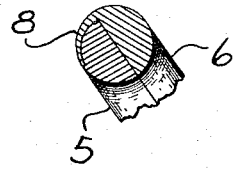

In Fig. 1 the eye 4 is shown as being open. At this time the latch or tongue 8 extends at right angles from the peripheral portion of the hook 6. In view of this condition a chain or other suitable part can be easily connected with the eye. When the connection is made, the eye will be closed as shown for example in Fig. 4 to cause the latch or tongue 8 to be projected into the seat or notch 9. When this is done the latch or tongue will be bent into the seat or notch 9 as shown in Fig. 5, thus fitting partially around the hook 5 and effectually preventing accidental opening of the hook when the latch is set. To open the eye it is simply necessary to straighten out the latch at which point the hooks can be separated to disconnect the chain therefrom.

What I claim is:

1. A device of the class described comprising an eye formed of hooks which relatively open and close, one of the hooks having a latch bendable over the other when the hooks are closed to maintain the closed relation.

2. A device of the class described comprising a shank provided at different points in its length with a snap, and two coöperating hooks which relatively open and close, one of the hooks being provided with a latch bendable around the other, to hold the hooks in closed relation.

3. A device of the class described having an eye portion comprising two hooks which relatively open and close, said eye portion being directly provided with means to positively hold the hooks in closed relation against accidental opening movement.

4. A device of the class described comprising an eye formed of hooks which relatively open and close, one of the hooks having a latch and the other having a seat into which the latch is bendable to hold the hooks closed.

5. A device of the class described comprising an eye formed of hooks which relatively swing toward and from each other, one of the hooks having an integral latch and the other having a notch opposite the latch and into which the latter is bendable.

6. A device of the class described comprising an elongated shank provided at one end with a snap and at the other with a rigid hook, a second hook having a hinge connection with the first hook, the two hooks mating to form an eye when in abutting relation, one of the hooks being provided near its free end with a laterally extending integral latch and the other hook having a notch opening into the inner face of it and closed at its outer end, the latch being bendable into the notch when the hooks are in abutment.

In testimony whereof I affix my signature in the presence of two witnesses.

GEORGE W. TROOP.

Witnesses:
L. L. MARKEL,
HEATH SUTHERLAND.